April 19, 1927.  1,625,656
H. K. HARWICK
JOINT FOR ARTICULATED LOCOMOTIVES
Filed Sept. 28, 1926
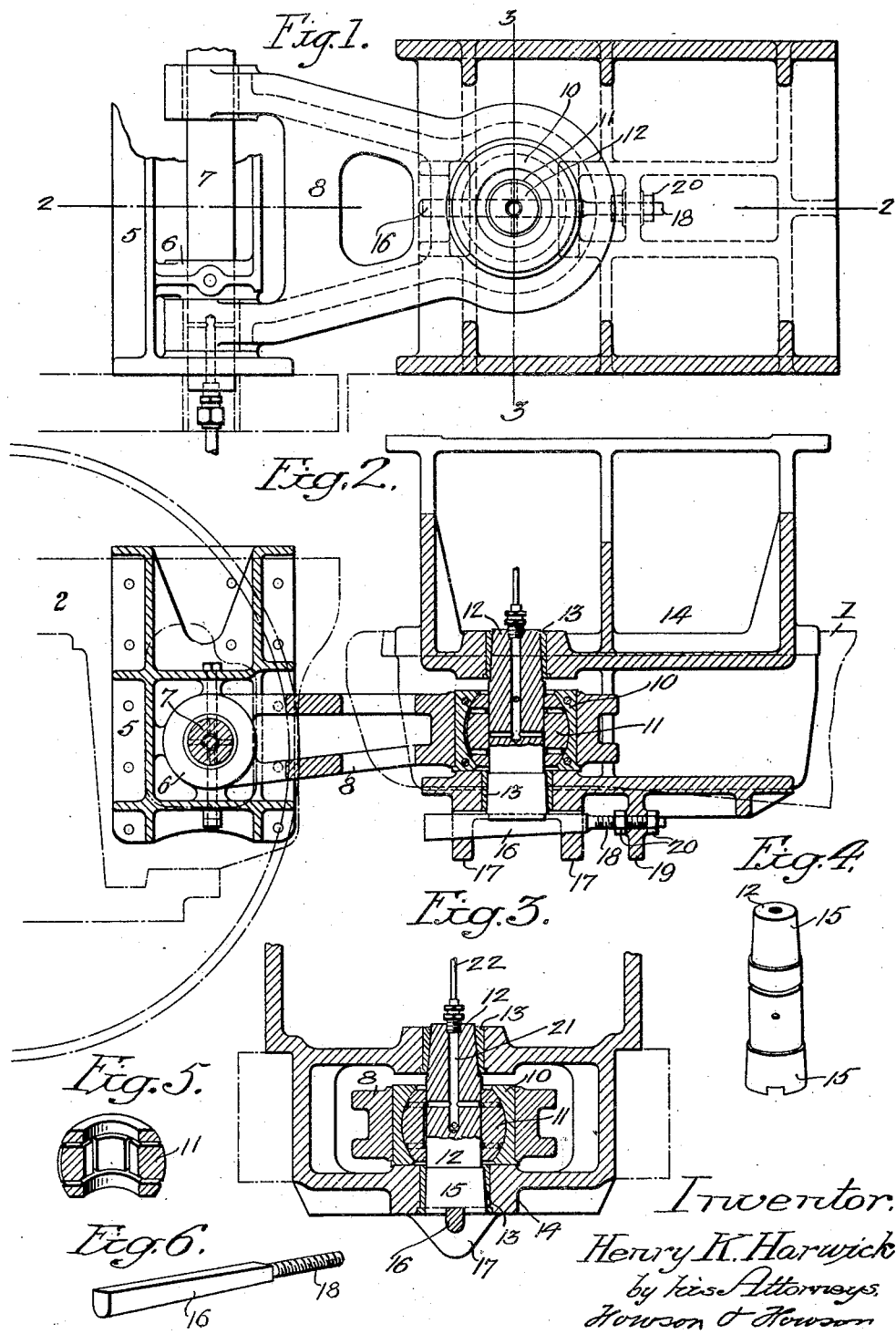
Inventor:
Henry K. Harwick
by his Attorneys,
Howson & Howson Patented Apr. 19, 1927.

1,625,656

UNITED STATES PATENT OFFICE.

HENRY K. HARWICK, OF PHILADELPHIA, PENNSYLVANIA.

JOINT FOR ARTICULATED LOCOMOTIVES.

Application filed September 28, 1926. Serial No. 138,265.

My invention relates to certain improvements in joints for articulated locomotives disclosed in the patent granted to Samuel M. Vauclain on June 2, 1914, No. 1,099,076.

One object of my invention is to improve the construction of the joint so that the pin can be adjusted to take-up wear or play in the bushings.

Another object of the invention is to provide for compression grease lubrication of the pin and ball.

In the accompanying drawing:

Fig. 1 is a plan view of my improved joint for articulated locomotives;

Fig. 2 is a longitudinal sectional view on the line 2—2, Fig. 1;

Fig. 3 is a transverse sectional view on the line 3—3, Fig. 1;

Fig. 4 is a detached perspective view of the coupling pin;

Fig. 5 is a sectional perspective view of the ball; and

Fig. 6 is a perspective view of the adjusting wedge.

Portions of the rear frame 1 of the locomotive and the forward frame 2 are shown by dotted lines in Figs. 1 and 2 of the drawings.

A casting 5 is secured to the forward frame 2, in the present instance, and formed in the casting are the bearings 6 for the transverse pin 7. Mounted on the pin 7 is a coupling member 8.

In the outer end of the coupling member 8 is an opening, in which is located a two-part socket 10, shaped to fit a ball 11. This ball is mounted on the pivot-pin 12 which has its bearings in bushings 13—13. The bushings are located in the casting 14 secured in the present instance to the rear frame 1.

The frame 14 is shaped to receive the socket end of the coupling member 8. The pivot-pin 12 has a tapered portion 15 at each end adapted to the tapered openings in the bushings 13. The pin is inserted from the bottom and is held in position by a horizontal key 16 which is tapered, as shown, and extends through openings in lugs 17 depending from the casting 14.

On one end of the key 16 is a threaded stem 18 which extends through an opening in a lug 19 on the casting 14. Mounted on the threaded stem on each side of the lug 19 is a nut 20. On turning the nuts, the wedge will be moved longitudinally and will in turn adjust the pivot-pin 12. By this means wear on the pin can be readily taken-up.

The pin 12 has a longitudinal grease passage 21 connecting with any lubricating system through a pipe 22, Fig. 3, and in the pin are transverse passages to allow grease to flow to the space between the ball and the pin. The ball is preferably provided with passages that form communications with the space between the pin and the ball, and between the ball and its socket.

The parts of the mechanism are so designed that each frame of the articulated locomotive will have an independent vertical movement and will also have an independent lateral movement. The ball will accommodate itself to any irregularities of the track.

The wear of the pin can be readily taken-up, and the bearing surface of the pin and ball are thoroughly lubricated at all times.

I claim:—

1. The combination in an articulated locomotive, of two frames; a coupling carried by one frame; a socket in the coupling; a vertical pivot-pin carried by the other frame; a ball mounted on the pin and having its seat in the socket; and means for longitudinally adjusting the pin to take-up wear in its bearings.

2. The combination in an articulated locomotive, of two frames; a coupling carried by one frame, said coupling having a socket; a ball mounted in the socket; a vertical coupling pin extending through the ball, said pin being tapered at each end; a tapered bushing on the other frame in which the pin is mounted; and means for longitudinally adjusting the pivot-pin in its bushings.

3. The combination in an articulated locomotive, of two frames; a coupling carried by one frame; a vertical pivot-pin carried by the other frame; socket members in the coupling; a ball mounted in the socket members, the pivot-pin extending through the ball, said pin being tapered at each end of the bushing in which the pin is mounted; a horizontal wedge extending under the pin and through lugs on the frame; and means for adjusting the wedge.

4. The combination of two frames; a coupling pivoted to one frame; a pivot-pin mounted in bearings on the other frame; a socket in the couplings; a ball mounted in the socket, the pivot-pin extending through the ball, said pin having a tapered fit in its bearings; a wedge extending under the pivot-pin and through lugs on the frame, the wedge having a threaded extension extending through a lug; and a nut on the extension at each side of the lug.

5. The combination in an articulated locomotive, of two frames; a coupling pivoted to one frame and having a socket; a ball mounted in the socket; a vertical pivot-pin on the other frame and extending through the ball; and means for holding the pin in position, said pin having a longitudinal lubricating passage and a transverse connecting passage, the ball having passages therein, allowing lubricant to flow to the bearing between the ball and its socket and the pin and the ball.

HENRY K. HARWICK.